United States Patent [19] [11] Patent Number: 4,492,196
Oshizawa [45] Date of Patent: Jan. 8, 1985

[54] ELECTRONICALLY CONTROLLED FUEL INJECTION APPARATUS

[75] Inventor: Hidekazu Oshizawa, Kumagaya, Japan

[73] Assignee: Diesel Kiki Co., Ltd., Tokyo, Japan

[21] Appl. No.: 296,766

[22] Filed: Aug. 27, 1981

[30] Foreign Application Priority Data

Sep. 11, 1980 [JP] Japan .................................. 55-128528

[51] Int. Cl.³ ........................ F02M 39/00; F02B 25/08
[52] U.S. Cl. .............................. 123/357; 123/198 DB; 123/198 D; 123/479
[58] Field of Search ............ 123/494, 198 D, 198 DB, 123/357, 479, 449; 73/119 A

[56] References Cited

U.S. PATENT DOCUMENTS 3,718,123 2/1973 Eckert .................................. 123/357
3,834,361 9/1974 Keely .................................. 123/479
4,058,106 11/1977 Drews .......................... 123/198 DB
4,395,905 8/1983 Fujimori .............................. 123/449

Primary Examiner—Andrew M. Dolinar
Assistant Examiner—Carl Stuart Miller
Attorney, Agent, or Firm—James C. Wray

[57] ABSTRACT

In an electronically controlled fuel injection apparatus which has fuel injection amount control system wherein a position signal indicating an actual position of a fuel injection amount adjusting member is fed back thereto, the apparatus has a speed control data generator for controlling the apparatus without the position signal and the apparatus is adapted to be controlled in accordance with the speed control data when the position signal cannot be obtained.

8 Claims, 7 Drawing Figures

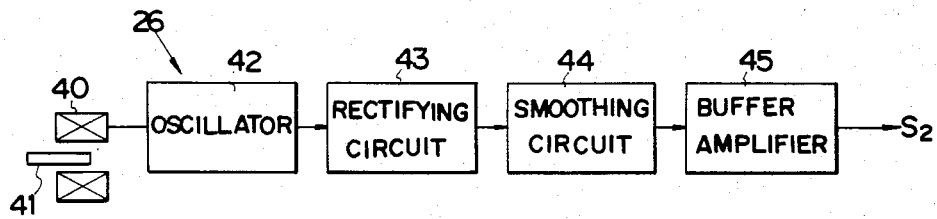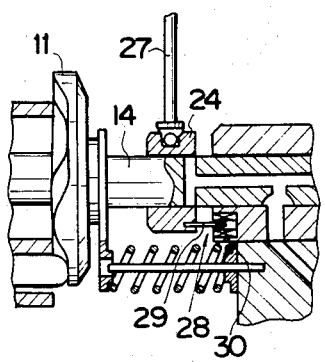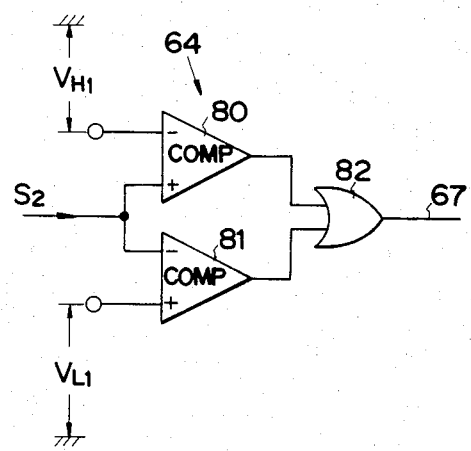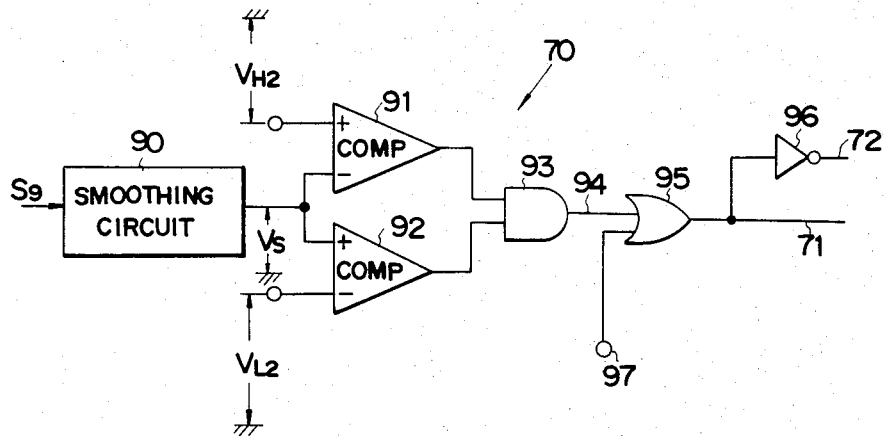

ELECTRONICALLY CONTROLLED FUEL INJECTION APPARATUS

This invention relates to an electronically controlled fuel injection apparatus for an internal combustion engine, and more particularly to an electronically controlled fuel injection apparatus wherein a signal indicating the position of a fuel amount adjusting member is fed back to the control system of an actuator for driving the fuel amount adjusting member.

In conventional electronically controlled fuel injection apparatus of this kind, an optimum amount of fuel injection is computed moment by moment in accordance with information indicating the conditions of engine operation such as for example engine speed and accelerator pedal position, and the position of the fuel amount adjusting member is controlled in such a way that the actual position of the fuel amount adjusting member becomes coincident with the target position of the fuel amount adjusting member necessary for obtaining the computed amount of fuel injection. To perform the abovementioned operation, this type of apparatus has a sensor for generating a signal indicating the position of the fuel amount adjusting member, and the signal is fed back to construct a closed loop control system for positioning the member. Therefore, any trouble arising in the position-detecting sensor renders impossible the operation for adjusting the amount of fuel injection and thus makes it impossible for the engine to continue operating. The reliability of the apparatus is extremely impaired if it is necessary to stop the engine just because trouble occurs in the position-detecting sensor. When the apparatus is used for vehicles, engine inoperability means it is impossible for the vehicle to move under its own power. The extreme inconvenience requires measures to remedy the situation.

An object of the present invention is, therefore, to provide an improved electronically controlled fuel injection apparatus wherein the above mentioned defects of the conventional electronically controlled fuel injection apparatus are eliminated.

Another object of the present invention is to provide an electronically controlled fuel injection apparatus whereby the engine operation can be continued under good conditions even if trouble occurs in the sensor for detecting the position of the fuel injection amount adjusting member.

An electronically controlled fuel injection apparatus according to the present invention comprises an electric actuator for driving a member for adjusting the amount of fuel injection, a sensor for generating a position signal indicating the position of the member and a first control circuit for generating a first control signal for controlling said actuator in such a way that said member is positioned so that a desired amount of fuel injection is carried out, said amount being in accordance with the operating conditions of the engine, the position signal being applied to the first control circuit as a feed-back signal. The electronically controlled fuel injection apparatus further comprises a circuit for detecting the occurrence of sensor fault, a second control circuit for generating a second control signal for controlling the position of the fuel injection amount adjusting member in such a way that a predetermined internal combustion engine rotational speed is provided in accordance with the position of an accelerator pedal, the signal indicating the rotational speed of said engine being applied to the second control circuit, and a switching circuit for selectively switching the control signals in response to the fault detecting operation of said detecting circuit in such a way that the actuator is controlled by said first control signal in the case of normal sensors condition and by the second control signal in the case of abnormal sensors condition.

According to the above-mentioned apparatus of the present invention, if trouble develops in the sensor for detecting the position of the fuel amount adjusting member, the speed control operation is immediately changed to a closed loop control system utilizing engine speed feed-back signals, the apparatus continues to allow the stable operate of the engine, so that the reliability of the apparatus is remarkably improved. In addition, when a microcomputer is used, this speed control operation canbe easily realized by use of the computer program, eliminating the need for complicated hardware or expensive sensors for this control, and as such is highly advantageous, economically.

Further objects and advantages of the present invention will be apparent from the following detailed description to be read in conjunction with the accompanying drawings in which:

FIG. 2 is detailed block diagram of the position sensor of FIG. 1;

FIG. 3 is a sectional view illustrating another arrangement of the position sensor for detecting a control sleeve;

FIG. 5 is a detailed block diagram of the sensor trouble detector of FIG. 4;

FIG. 6 is a detailed block diagram of the actuator trouble detector of FIG. 4.

Figure 1:
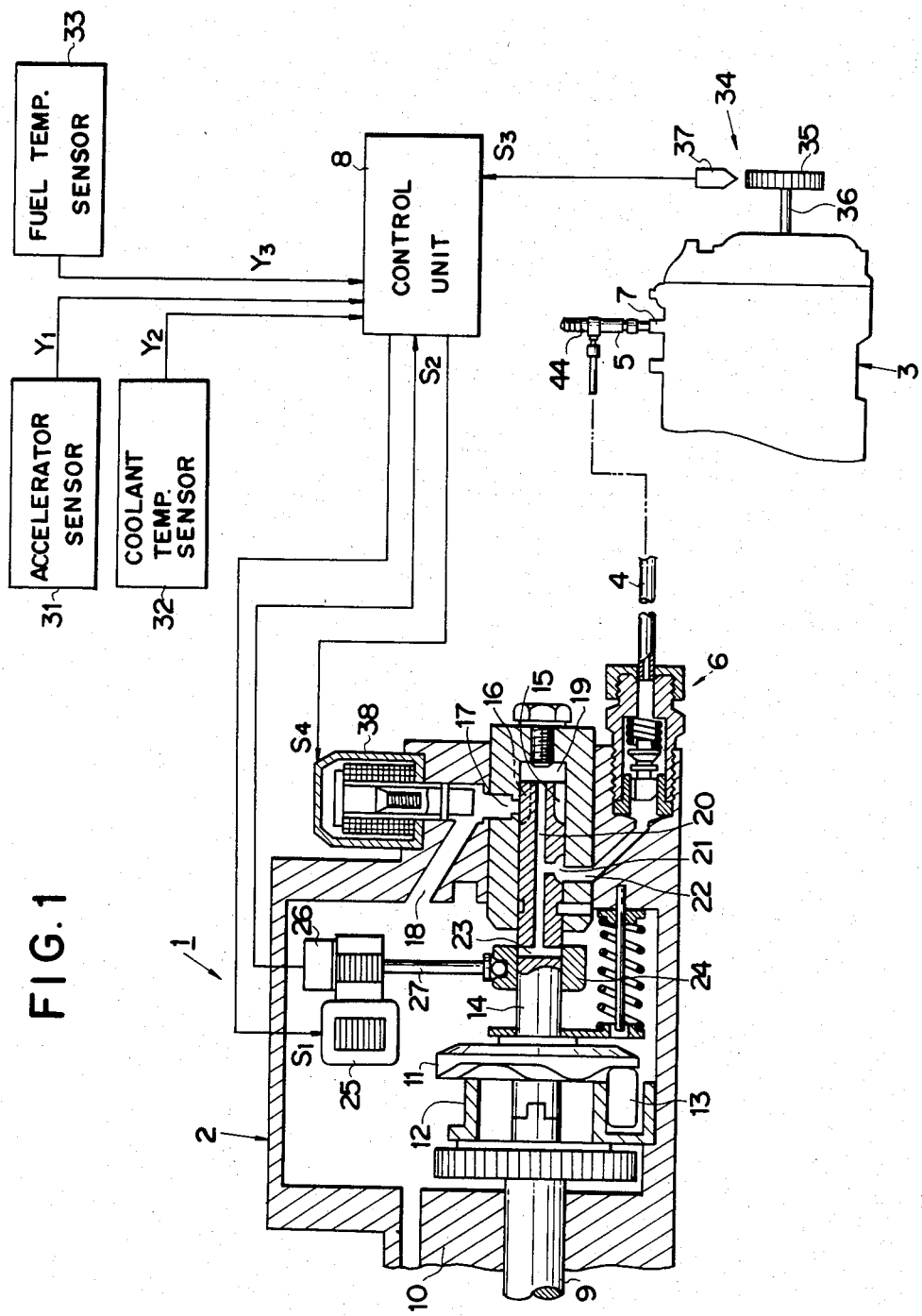
FIG. 1 is a schematic block diagram of one embodiment of an electronically controlled fuel injection apparatus of the present invention including a sectional view of a fuel injection pump.

FIG. 1 is a schematic block diagram of one embodiment of an electronically controlled fuel injection apparatus of the present invention and includes a sectional view of a fuel injection pump. An electronically controlled fuel injection apparatus 1 has a distribution type fuel injection pump 2 adapted to electronically control the amount of fuel injection and inject the fuel from a fuel tank (not shown) into the cylinders of a diesel engine 3 through injection pipes and injection nozzles. In FIG. 1, although there is shown only one injection pipe 4 and associated injection nozzle 5 between a delivery valve 6 of the injection pump 2 and a cylinder 7 of the engine 3, the fuel is also injected into the other cylinders of the engine 3 by the fuel injection pump 2 in a similar manner. The electronically controlled fuel injection apparatus 1 also has a control unit 8 for electronically controlling the amount of fuel injected from the fuel injection pump 2.

The fuel injection pump 2 has a drive shaft 9 supported by a housing 10 and driven by the engine 3, a cam disc 11 rotated by the drive shaft 9, and a roller holder 12 having a plurality of rollers (only one roller 13 is seen in FIG. 1). The rotation of cam disc 11 by the drive shaft 9 causes a plunger 14 simultaneously to reciprocate longitudinally and rotate. The plunger 14 is provided at one end portion thereof with intake slits the number of which is the same as the number of cylinders of the engine 3. (Only two intake slits 15, 16 are shown in the figure.) When an intake slit comes opposite an intake port 17 during the backward stroke of the plunger 14, pressurized fuel passes through a passage 18 into a high-pressure chamber 19 and a passage 20 formed in the plunger 14. Compression of the pressurized fuel introduced into the chamber 19 is begun when the intake port 17 is closed by the outside wall of the plunger 14 due to the reciprocating motion of the plunger 14. When a distributor slit 21 communicating with the passage 20 comes opposite an outlet passage 22 after further forward motion of the plunger 14, the compressed high-pressure fuel in the high pressure chamber 19 passes through the delivery valve 6 and is supplied into the combustion chamber of the engine 3 through the injection pipe 4 and the injection nozzle 5 mounted on the engine 3. When the plunger 14 is further advanced by the cam disc 11, a cut-off port 23 communicating with the passage 20 is disengaged from a control sleeve 24 to terminate the fuel injecting operation. The amount of fuel injected is adjusted by the relative positions of the control sleeve 24 and the plunger 14. To permit the adjustment, the control sleeve 24 is coupled to a solenoid actuator 25. The electric power to be supplied to the solenoid actuator 25 is controlled by the control unit 8 so as to change the position of the control sleeve 24 for freely adjusting the amount of fuel to be injected. The control unit 8 includes a circuit for controlling the driving of the solenoid actuator 25, which is driven by a driving signal $S_1$ from the control unit 8. On the actuator 25, there is provided a position sensor 26 for detecting the position of the control sleeve 24 and a sleeve position signal $S_2$ produced from the position sensor 26 is input into the control unit 8.

In FIG. 2, there is shown the block diagram of the sensor 26 which has a coil 40 and a core 41 placed in the coil 40. The core 41 is connected with an operating rod 27 provided for transmitting the movement of the actuator 25 to the control sleeve 24 and is displaced in relation to the displacement of the control sleeve 24. Consequently, the inductance of the coil 40 is changed in accordance with the position of the control sleeve 24. Such an arrangement is known in the prior art. The coil 40 is connected to an oscillator 42 which produces a signal changing in frequency in accordance with the inductance of the coil 40 at that time. The output signal from the oscillator 42 is applied to a rectifying circuit 43 and the rectified signal from the rectifying circuit 43 is provided to a smoothing circuit 44 to produce a voltage signal having a level which is proportional to the position of the core 41, that is, the position of the control sleeve 24. The voltage signal is derived as the sleeve position signal $S_2$ through a buffer amplifier 45.

In this case, although the sensor 26 is adapted to detect indirectly the position of the control sleeve 24 by detecting the movement of the operating rod 27 provided for transmitting the movement of the actuator 25 to the control sleeve 24, the position of the control sleeve 24 may be arranged so as to detect directly the position of the control sleeve 24.

Referring to FIG. 3, there is shown an embodiment of a mechanical arrangement of a sensor for directly detecting the position of the control sleeve 24. The sensor 28 has a core 29 secured to the control sleeve 24 and a coil 30 in which the core is permitted to displace in accordance with the displacement of the control sleeve 24.

Figure 4:
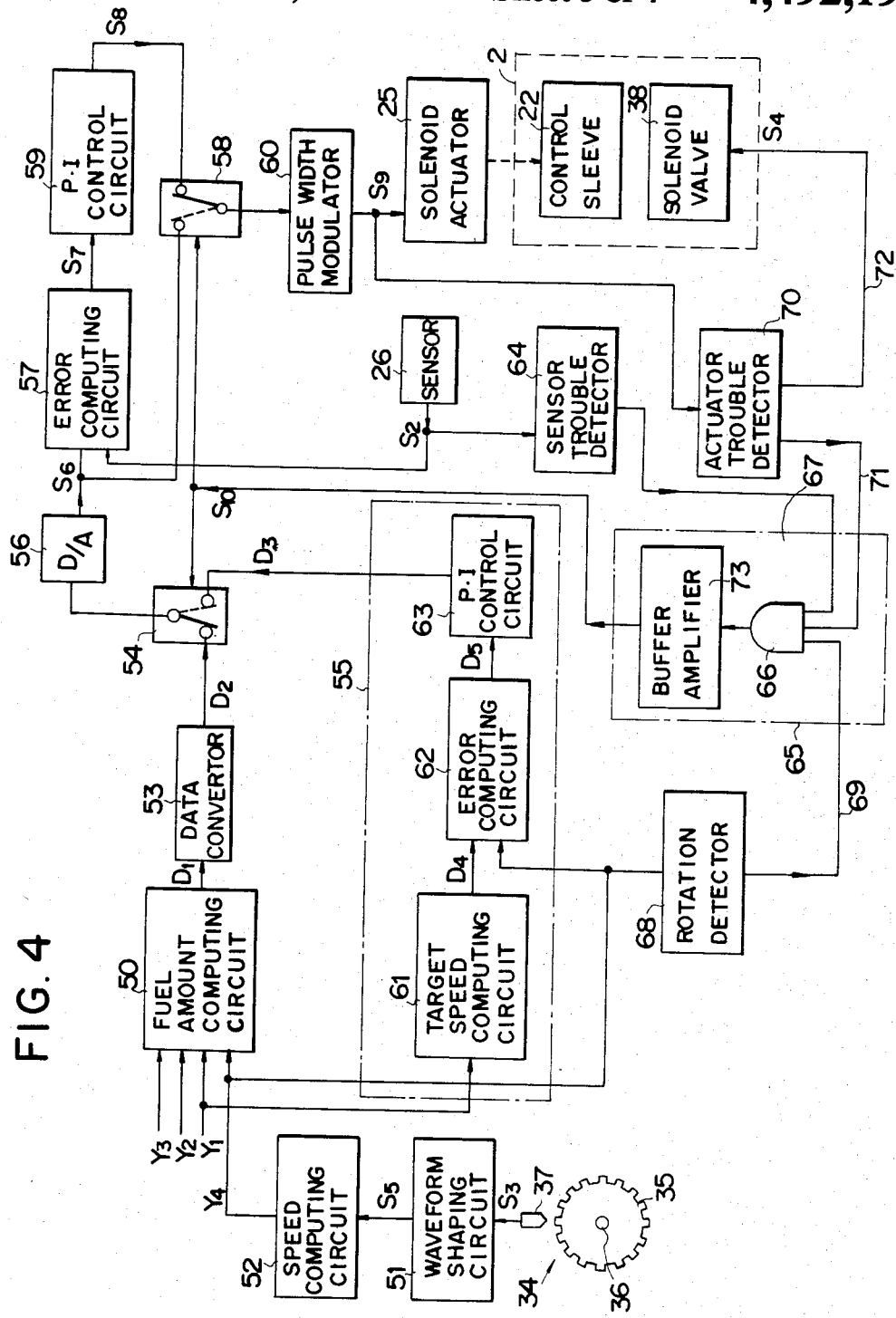
FIG. 4 is a block diagram of a control system of the fuel injection apparatus shown in FIG. 1.

Returning to FIG. 1, to produce the driving signal $S_1$ in accordance with the conditions of the engine operation, there are provided an accelerator sensor 31 for generating data $Y_1$ indicative of the position of an accelerator pedal (not shown), a coolant temperature sensor 32 for generating data $Y_2$ indicative of the temperature of the coolant for the engine 3 and a fuel temperature sensor 33 for generating data $Y_3$ indicative of the temperature of the fuel. These data $Y_1$ to $Y_3$ are produced in digital form. Moreover, for detecting engine speed of the engine 3, there is provided a speed sensor 34 which is composed of a gear 35 secured to a crankshaft 36 of the engine 3 and an electromagnetic pick-up coil 37. As shown in FIG. 4, a plurality of cogs are formed on the periphery of the gear 35 and an a.c. output signal is produced as the signal $S_3$ from the electromagnetic pick-up coil 37 as each cog approaches the coil 37 and then goes away from the coil 37 in sequence with the rotation of the engine 3. The signal $S_3$ changes in frequency in accordance with the engine speed.

At the housing 10, a fuel-cut solenoid valve 38 is provided for stopping the supply of fuel to the engine, the valve 38 being closed or opened in accordance with a driving signal $S_4$ supplied from the control unit 8.

FIG. 4 illustrates a block diagram of a control system of the fuel injection apparatus shown in FIG. 1. The control system controls the position of the control sleeve 24 in such a way that the optimum amount of fuel can be injected into each cylinder of the engine in accordance with the condition of the engine operation. This control system has a fuel amount computing circuit 50 for computing the optimum amount of fuel injection from moment to moment, to which various information concerning the conditions of the engine operation is applied in the form of electric data signals. As is well known, what the optimum amount of fuel injection is depends upon the conditions of the engine operation at any moment, and the relationship between the optimum amount of fuel injection and the operating conditions of the engine, such as engine speed, coolant temperature, and the degree of the depression of the accelerator pedal, can usually be determined experimentally. In this embodiment, data $Y_1$, $Y_2$ and $Y_3$ and engine speed data $Y_4$ are applied thereto in digital form, and the optimum amount of fuel injection at that time is computed in the fuel amount computing circuit 50 on the basis of these input data. The fuel amount computing circuit 50 includes a memory in which the data concerning the above relationship obtained in the way mentioned above is stored and the optimum amount of fuel injection can be selected in accordance with the set of the input digital data mentioned above. There is known an electronic circuit which includes a memory for storing the resulting data determined by the input data in advance and which can output the stored data corresponding to the input data from the memory when the input data is applied to the electronic circuit. It is one of the prior art techniques to store the resulting data in advance at the address of the memory designated by the input data corresponding to the resulting data and to obtain the resulting data by applying the input data to the memory as address data. (For example, U.S. Pat. No. 3,689,753) Then, optimum injection amount data $D_1$ indicating the computed result in the circuit 50 is output in digital form.

For supplying the engine speed data $Y_4$ to the computing circuit 50, the waveform of the signal $S_3$ is shaped in a waveform shaping circuit 51 to convert the signal $S_3$ into a square wave signal $S_5$, and then, the square wave signal $S_5$ having the same frequency as that of the signal $S_3$ is applied to a speed computing circuit 52 for computing the engine speed at each instant on the basis of the signal $S_5$. Thus, the computed engine speed data $Y_4$ indicating the engine speed at each instant in digital form is produced from the speed computing circuit 52.

Data $D_1$ indicating the optimum amount of fuel injection is input into a data convertor 53 for conversion into target position data $D_2$ indicative of the position of the control sleeve 24 necessary for supplying the amount of fuel indicated by the data $D_1$ to the engine, and data $D_2$ is then applied to a change-over switch 54. The data convertor 53 may also be arranged by the use of Read Only Memory (ROM) in which the data indicating the relationship between the value of the optimum amount of fuel injection and the position of the control sleeve for providing this optimum amount of fuel injection is stored in advance in a similar way to that of the computing circuit 50. A speed control data $D_3$ is separately applied from a speed control data generator 55, which will be described in more detail hereinafter, to the change-over switch 54 and either data $D_2$ or $D_3$ is selected as a control data by the change-over switch 54.

The selected control data from the switch 54 is applied to an digital-analog (D/A) convertor 56 to convert it to corresponding analog form and a control signal $S_6$ in analog form derived from the D/A convertor 56 is applied to an error computing circuit 57 and a change-over switch 58. The change-over switch 58 is switched over at the same time as the change-over switch 54 is switched over as will be described hereinafter, and the control signal $S_6$ corresponding to the data $D_2$ is output from the change-over switch 58 through the error computing circuit 57 and PI control circuit 59 when the change-over switches 54 and 58 are switched over as shown by the solid lines of FIG. 4. The sleeve position signal $S_2$ indicating the acutal position of the control sleeve 24, which is the member for adjusting the amount of fuel injection, is also applied to the error computing circuit 57 in addition to the control signal $S_6$ to produce an error signal $S_7$ indicating the difference between the signals $S_2$ and $S_6$. Consequently, the error signal $S_7$ represents the difference between the actual position of the control sleeve 24 and the target position for the control sleeve 24 and varies in magnitude according to the difference. The error signal $S_7$ is applied to the PI control circuit where it is processed to enable it to carry out proportion-integration (PI) control operation, and the resulting output signal $S_8$ is applied to a pulse width modulator 60 through the change-over switch 58. The pulse width modulator 60 produces a driving pulse signal $S_9$ whose duty ratio is changed in accordance with the level of the output signal from the change-over switch 58. The driving pulse signal $S_9$ is applied to the solenoid actuator 25 to drive the actuator 25 so as to position the control sleeve 24 in accordance with the duty ratio of the signal $S_9$.

The positional change of the control sleeve 26 effected by the actuator 25 is fed back as a change in the position signal $S_2$ to the input side of the error computing circuit 57, so that the control sleeve 24 is positioned in such a way that the difference indicated by the signal $S_7$ becomes zero. Therefore, the amount of fuel injected from the fuel injection pump 2 is controlled so as to become the optimum amount of fuel injection determined in the fuel amount computing circuit 50.

In order to carry out with certainty the closed-loop speed control operation for the engine without stopping of the engine even if an impairment of sensor 26 makes it impossible to control the amount of fuel injection, there is provided a speed control data generating circuit 55 having a target speed computing circuit 61. The target speed computing circuit 61 includes a memory in which the relationship between the degree of depression of the accelerator pedal and the corresponding target speed of the engine is stored and target speed data $D_4$ indicating a predetermined engine speed corresponding to the depression degree at any moment can be produced by applying data $Y_1$ to the circuit 61 as address data. The target speed data $D_4$ and the speed data $Y_4$ are input to an error computing circuit 62 to compute the difference between them, and error data $D_5$ representing the difference between the target engine speed and the actual engine speed is produced and is processed in a PI control circuit 63 for conversion to data adapted to carry out a proportion-integration control poperation.

For the purpose of switching over the change-over switches 54 and 58 from the position shown by the solid lines to the position shown by the dotted lines to change the control system from a fuel amount control operation to a speed control operation according to the speed control data $D_3$, when any trouble occurs in the sensor 26 which makes the operation for controlling the amount of fuel injection impossible, there are provided a sensor trouble detector 64 and a switching signal generator 65. The sensor trouble detector 64 is a circuit for detecting the occurrence of such trouble in the sensor 26 on the basis of the sleeve position signal $S_2$, the existence of such trouble being determined by the detector 64 on the basis of whether or not it detects the level of the sleeve position signal $S_2$ as being within a predetermined range.

FIG. 5 is a detail block diagram of the sensor trouble detector 64. The signal $S_2$ is applied to a non-inverting input terminal of a voltage comparator 80 and an inverting input terminal of another voltage comparator 81 and a voltage $V_{H1}$ and a voltage $V_{L1}$ are applied to an inverting input terminal of the voltage comparator 80 and a non-inverting input terminal of the voltage comparator 81, respectively. The level of the voltage $V_{H1}$ is slightly more than the upper limit of the normal level range of the signal $S_2$ and the level of the voltage $V_{L1}$ is slightly less than the lower limit of that of the signal $S_2$. Therefore, bothe output levels of these voltage comparators 80 and 81 are low because the level of the signal $S_2$ is between the levels of $V_{H1}$ and $V_{L1}$ when the sensor 26 operates normally, whereas one of the output levels rises when the level of the signal $S_2$ is not between the levels of $V_{H1}$ and $V_{L1}$ due to trouble occurring in the sensor 26. The output terminals of these voltage comparators 80 and 81 are connected to the input terminals of an OR gate 82. As a result, the signal level in an output line 67 of the sensor trouble detector 64 becomes high only when any trouble occurs in the sensor 26.

The output line 67 is connected to an input terminal of an AND gate 66 and the other input terminals of the AND gate 66 are connected to an output line 69 of a rotation detector 68 for detecting whether or not the engine is being operated and to a first output line 71 of an actuator trouble detector 70 for detecting whether or not the solenoid actuator 25 is operating normally. The speed data $Y_4$ is applied to the rotation detector 68 which detects whether the engine speed is less than a predetermined level (e.g. 500 rpm) on the basis of the speed data $Y_3$. The signal level of the output line 69 is high when the engine speed is not less than the predetermined level and low when the engine speed is less than the predetermined level.

FIG. 6 is a block diagram of the actuator trouble detector 70 having a smoothing circuit 90 for producing an analog voltage $V_S$ whose level varies in accordance with the duty ratio of the driving pulse signal $S_9$. The voltage $V_S$ is applied to an inverting input terminal of a voltage comparator 91 and a non-inverting input terminal of another voltage comparator 92 and a voltage $V_{H2}$ and a voltage $V_{L2}$ are applied to a non-inverting input terminal of the voltage comparator 91 and an inverting input terminal of the voltage comparator 92, respectively. The level of the voltage $V_{H2}$ is slightly more than the upper limit of the normal design level range of the voltage $V_S$ and the level of the vlotage $V_{L2}$ is slightly less than the lower limit of that of the voltage $V_S$. Therefore, both output levels of these voltage comparators 91 and 92 are high because the level of the voltage $V_S$ is between the levels of $V_{H2}$ and $V_{L2}$ when the actuator 25 is operated normally by signal $S_9$, whereas one of these output levels becomes low when the level of the voltage $V_S$ is not between the levels of $V_{H2}$ and $V_{L2}$ due to the signal $S_9$ not being produced normally because of trouble in solednoid actuator 25. The output terminals of these voltage comparators 91 and 92 are connected to the input terminals of an AND gate 93, and the output line 94 of the AND gate 93 is connected to an input terminal of an OR gate 95 whose output terminal is connected to a first output line 71. As a result, the signal level of the first output line 71 becomes low only when any trouble occurs in the operation of the solenoid actuator 25, and is therefore high when no trouble occurs in the operation of the solenoid actuator 25. Since the output terminal of the OR gate 95 is connected to a second output line 72 through an inverter 96, the level of the second output line 72 becomes high only when trouble occurs in the operation of the solenoid actuator 25. In addition, a start signal from the starting circuit of a diesel engine 3 (not shown) is applied to a terminal 97 to raise the level in the line 71 forcibly so as not to impair the starting operation of the engine.

Thus, if any trouble occurs in the sensor 26 while the engine is in operation and the actuator 25 normally operating, the output level of the AND gate 66 becomes high; for other conditions the output level is low.

The output signal from the AND gate 66 is applied as a switch-over signal $S_{10}$ to change-over switches 54 and 58 through a buffer amplifier 73. The switch positions of these change-over switches 54 and 58 are as shown by the solid lines when the level of the signal $S_{10}$ is low and change to the position shown by the dotted lines when the level of the signal $S_{10}$ becomes high.

In addition, the signal level of the second output line 72 of the actuator trouble detector 70 becomes high when any trouble on the actuator is detected by the detector 70, and the signal $S_4$ for actuating the fuel-cut solenoid valve 38 is produced, stopping the suction of fuel into the pump 2, rendering the engine inoperable.

The operation of the apparatus shown in FIG. 4 will now be described. When the solenoid actuator 25 and sensor 26 are operating normally, the change-over switches 54 and 58 are switched to the positions shown by the solid lines so that the above-described controlling operation is carried out for supplying to the engine the optimum amount of fuel injection for the conditions of engine operation. Any trouble in the sensor 26 causes the change-over switches 54 and 58 to switch to the positions shown by the dotted lines if engine is operating normally and there is no problem with the solenoid actuator 25, so that the driving pulse signal $S_9$ whose duty ratio varies in accordance with the speed control data $D_3$ is applied to the solenoid actuator 25. As a result, the control system controls the position of the control sleeve 24 so as to keep the engine operating at the target speed indicated by the target speed data $D_4$. Thus, the engine speed is controlled in accordance with the degree of depression of the accelerator pedal when any such trouble occurs in the sensor 26, so that there is no loss of control.

In this embodiment, since the error data $D_5$ is processed by the PI control circuit, the speed control characteristics become equivalent to those of an isochronous governor. However, if the PI control circuit 63 is changed to a proportioned (P) control circuit to enable the control system to carry out proportional control operation, the so-called regulation added to the speed control characteristics will improve the feel of the accelerator.

Figure 7:
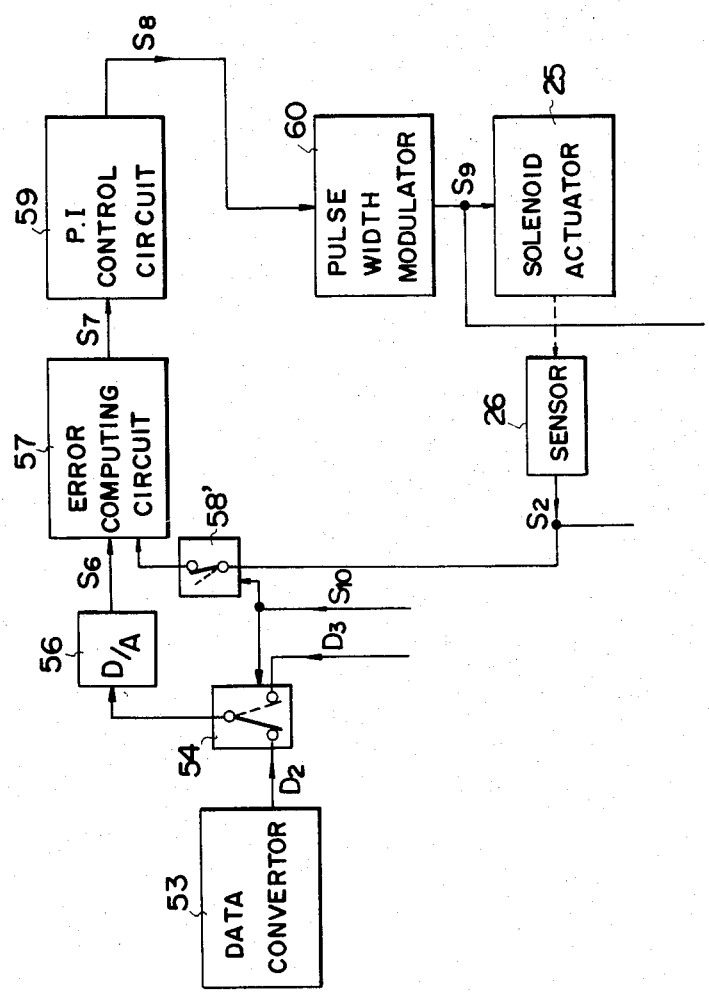
FIG. 7 is a block diagram of part of the modified control system of FIG. 4.

In this embodiment, although the apparatus is arranged so as the error computing circuit 57 and the PI control circuit 59 are disconnected by the switch 58 when the system is changed to the speed control mode, if as shown in FIG. 7 the circuit is arranged so that the sensor 26 is disconnected from the error computing circuit 57 by a switch 58' and the d.c. gain of the PI control circuit 59 is reduced sufficiently in response to the detection of any trouble in the position sensor 26, disconnection of the circuits 57 and 59 is not necessary.

The present invention has been described in an embodiment in which a distribution type fuel injection pump is used; however, the present invention is also applicable to apparatus employing other types of fuel injection pump, such as an in-line type.

I claim:

1. An electronically controlled fuel injection apparatus for an internal combustion engine, comprising:

means for actuating a member for adjusting the amount of fuel injection;

a position sensor for producing a first signal indicating the position of said member;

at least one condition sensor for generating condition data indicating the operating condition of said engine;

a circuit for generating a first target signal indicating the position of said adjusting member necessary for injecting the optimum amount of fuel based on said condition data;

a circuit for generating a first control signal in accordance with the difference between said first target signal and said first signal;

a first detector for detecting the occurrence of trouble in said position sensor;

a circuit for producing a second target signal in accordance with the operating quantity of an accelerator pedal, said second target signal being indicative of an engine speed decided in advance in correspondence to said operating quantity of an accelerator pedal;

means for generating a second signal indicative of the rotational speed of the engine;

a circuit for producing a second control signal in accordance with the difference between said second target signal and said second signal; and a switching means for selectively providing either of said first and said second control signals to said actuating means in response to the result of detecting operation of said first detector in such a way that said actuating means is controlled in accordance with said first control signal for the normal condition of said position sensor and is controlled in accordance with said second control signal for the abnormal condition of said position sensor.

2. An electronically controlled fuel injection apparatus as claimed in claim 1 further comprising a high pressure fuel injection pump.

3. The apparatus of claim 1 wherein the means for actuating a member for adjusting the amount of fuel injection comprises an axially slideable sleeve within a fuel pump.

4. An electronically controlled fuel injection apparatus as claimed in claim 1 wherein said actuating means has a circuit for generating a driving pulse signal whose duty ratio varies in accordance with the signal selected by said switching means, a solenoid actuator for positioning said adjusting member, said solenoid actuator being operated by said driving pulse signal.

5. An elecrronically controlled fuel injection apparatus as claimed in claim 1 wherein said first detector detects whether or not the level of said first signal is within a predetermined range to discriminate thereby the occurrence of trouble in said position sensor.

6. An electronically controlled fuel injeciton apparatus claimed in claim 1, said apparatus further comprising a second detector for detecting the occurrence of trouble in said actuating means and means for stopping the suction of fuel in response to the detection result of said second detector.

7. An electronically controlled fuel injection apparatus claimed in claim 6 wherein said apparatus further comprises a third detector for detecting that said engine is operating, and said switching means is operated in response to the output signal from said first detector only when the normal operating conditions of said engine and said actuating means are detected by means of said second and third detectors.

8. An electronically controlled fuel injection apparatus claimed in claim 4, said apparatus further comprising a circuit for smoothing said driving pulse signal, a level discriminator for detecting that the level of a signal produced from said smoothing circuit is out of a predetermined range, and means for stopping the section of fuel in response to the discrimination result of said level discriminator.

* * * * *